March 11, 1969 W. J. ELLEBOUDT 3,432,128
CHANNEL ASSEMBLY FOR FLEXIBLE TUBING, CONDUCTORS, AND THE LIKE
Filed April 13, 1967
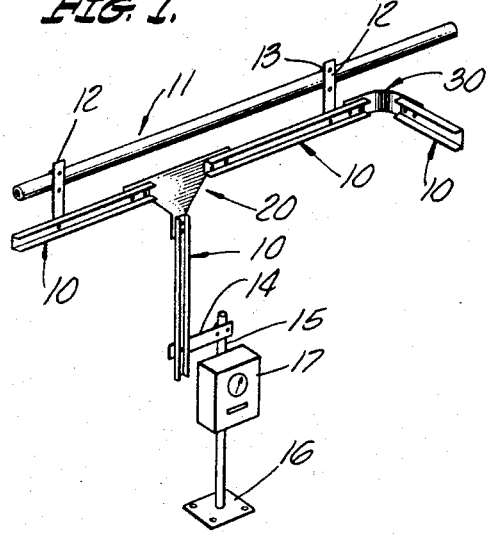
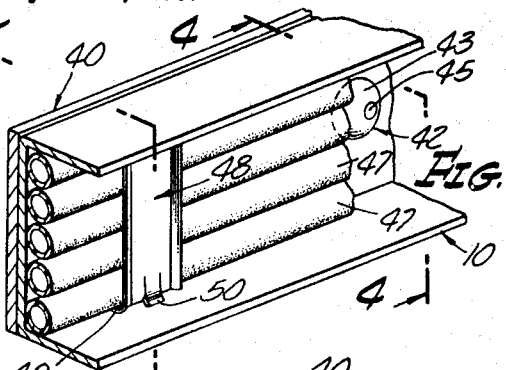
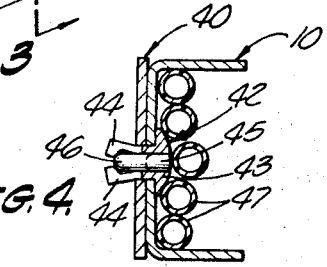
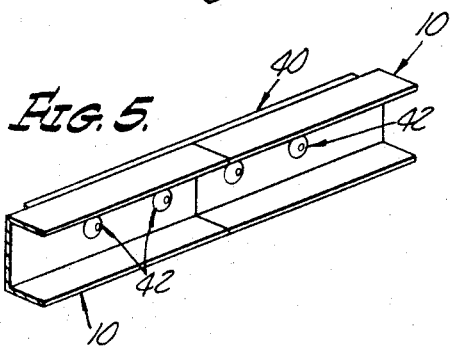
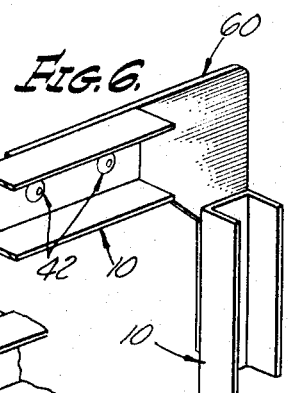
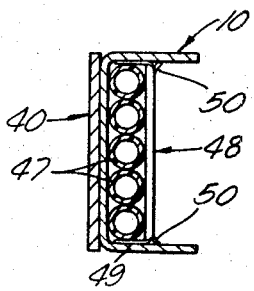
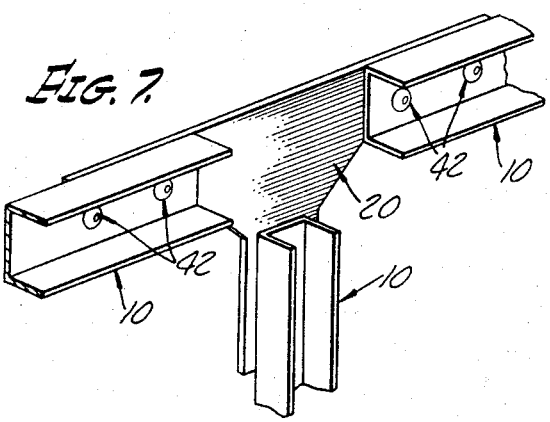
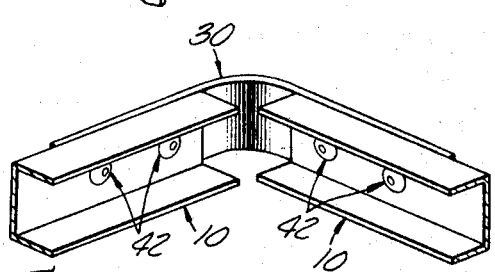
INVENTOR.
WALTER J. ELLEBOUDT
BY Sellers & Beach
ATTORNEYS

United States Patent Office 3,432,128
Patented Mar. 11, 1969

3,432,128
CHANNEL ASSEMBLY FOR FLEXIBLE TUBING, CONDUCTORS, AND THE LIKE
Walter J. Elleboudt, 10814 E. Monte Vista Drive, Whittier, Calif. 90601
Filed Apr. 13, 1967, Ser. No. 630,572
U.S. Cl. 248—68
Int. Cl. F16l 3/22; A47f 5/10
5 Claims

ABSTRACT OF THE DISCLOSURE

A channel assembly for the protective support of flexible tubing, conductors and the like featuring a simple plate-like connector plate blanked from sheet stock and channel members lying in the same plane or in planes lying at an angle to one another. A self-locking clip designed to straddle the contents of the channeling is easily inserted without tools and effective to hold the contents of the channeling captive.

This invention relates to channeling used to protect and distribute tubing interconnecting instrumentation and components of control systems such as the tubing commonly employed to transmit air control signals to diaphragm valves and signals from sensor devices to indicating, recording and control instruments. Such channeling is used extensively in open plant areas and is supported at intervals from adjacent piping, structural supports, handrails, or any other conveniently available support structure. The invention features a simple more economical and highly versatile connector fitting for use in interconnecting two or more adjacent ends of channeling at junctions irrespective of the number of branchouts, the plane in which the channels merge or the relative sizes of the channels at that junction. For this purpose there is provided a connector plate having a plurality of arms each formed with a plurality of fastener openings. The connector plates are formed from sheet stock and are free of side flanges, ribs or other protrusions interfering with the use of the plates with channeling of any selected width. The arms of the connector plates are useable as templates in providing the webs of the channels connectible therewith with accurately spaced openings for receiving the assembly fasteners. Simple self-locking retainers are insertable crosswise of the channel to hold one or more flexible ducts, tubes or conductors firmly in place in the channels.

It will be understood that the present invention provides a simpler, more rugged and a more economical mode of installing channeling along walls, ceilings and paneling generally, with improved provision for branch-offs in any direction or plane.

These objectives are achieved by the use of a simple connector plate formed from flat sheet stock with the requisite number of appropriately directed arms each preferably having a pair of mounting holes for any suitable type of fastener. The absence of side flanges on the mounting plate saves space, avoids the need for close tolerances, reduces the weight and cost of the assembly, permits the arms of the connector plates to be bent as necessary to suit the needs of a particular installation and, of particular importance, permits use of the same connector between channeling of assorted widths and sizes.

Accordingly, it is a primary object of the present invention to provide an improved, more economical, lighter weight and more easily and quickly assembled channel assembly for distributing and protecting flexible tubing, conductors and the like.

Another object of the invention is the provision of a channel connector assembly for joining a plurality of channel members rigidly together regardless of the similar or differing sizes of the channel members.

These and other more specific objects will appear upon reading the following specification and claims and upon considering in connection therewith the attached drawing to which they relate.

Referring now to the drawing in which preferred embodiments of the invention are illustrated.

FIGURE 1 is a fragmentary perspective view showing illustrative embodiments of the invention connector installed in a typical operating environment;

FIGURE 2 is a fragmentary perspective view on enlarged scale showing a portion of a junction assembly with tubing held installed therein by a self-locking retainer;

FIGURES 3 and 4 are cross-sectional views taken along lines 3—3 and 4—4, respectively, on FIGURE 2;

FIGURE 5 is a perspective view of another embodiment of the channel connector connecting a pair of aligned channels in abutting relation;

FIGURE 6 is a perspective view of a channel assembly utilizing an L-shaped connector;

FIGURE 7 is a view in perspective showing a channel assembly utilizing a T-shaped connector plate interconnecting three channel ends of differing sizes; and FIGURE 8 is an enlarged perspective view of the L-shaped connector shown in FIGURE 1.

Referring more particularly to FIGURE 1, there is shown a fragmentary portion of a typical installation of the invention in an outdoor environment, the channeling 10 being there shown as suspended from an overhead pipe 11 by means of hangers 12 clamped to the piping by U-bolts 13. Additional support for the vertically extending channel 10 is provided by bracket 14 anchored to an upright 15 secured to the pavement by base plate 16. Upright 15 is also employed as a support for an instrument 17 adapted to be controlled or monitored by one or more flexible ducts, not shown, installed in channel system 10 and connected with associated instrumentation at some distant point. The several lengths of channeling 10 shown in FIGURE 1 are rigidly interconnected by two typical embodiments 20, 30 of the invention connector plate and shown in greater detail in FIGURES 7 and 8, respectively.

Referring next to FIGURES 2, 3 and 4 there is shown the simplest embodiment of the connector plate comprising a straight flat strip 40 and useful to interconnect adjacent ends of channels 10, 10 in direct abutting relation with one another. It will be understood that the channel ends and connector 40 can be rigidly secured together by fasteners of a wide variety of types and operating principles. Because of the speed and facility with which it can be installed, a particularly suitable construction is the expanding type designated 42 in the drawing. This fastener can be assembled and set from one side of the channeling using a single sharp blow from a setting tool, such as a hammer.

A fastener of this type is illustrated in detail in FIGURE 4 and includes a head 43 integral with a hollow shank. This shank has a pair of slots extending crosswise of its end and cooperating with the hollow interior of the shank to provide four L-shaped legs 44, only two of which are shown in FIGURE 4. A hardened pin member 45 has a rounded inner end 46 cooperating with the adjacent cammed surfaces on the shorter legs of the L-shaped members 44 to expand these members away from one another and into powerful clenching action about the edges of the assembly hole when pin 45 is struck a sharp blow. It will be understood that initially and as the fastener is assembled into the hole, the outer end of pin 45 protrudes from the surface of head 43 by a short distance. The blow drives the setting pin inwardly until its outer end is flush with the head 43 at which time legs 44 are spread and clenched about the edges of the opening in which the fastener is assembled.

One the channel assembly is installed and rigidly supported, flexible tubing, indicated at 47, 47, is placed in the channel. Thereafter, one-piece self-locking retainer clips 48 are pressed downwardly astride the tubing. The design of the retainer clips herein illustrated by way of example, comprises a generally U-shaped main body formed from a strip of tempered sheet metal. The parallel short legs 49 are spaced to have a close sliding fit with the interior side wall surfaces of channel 10 and sufficient length to provide guides effective to hold the retainer generally parallel with the bottom of the channel while being installed. Desirably the legs also have a length as great as the diameter of the tubing to safeguard against installing the clips far enough to compress or pinch the tubing objectionably. A sharp edged locking tongue 50 projecting from either end of the retainer clip is so dimensioned as to be deflected outwardly slightly as the retainer is pressed into the channeling. In consequence, any tendency to displace the retainer outwardly causes the transverse inner corners of locking tongues 50 to bite into the side walls of the channel and positively lock the retainer against displacement. It will be understood that additional layers of tubing or conductors can be installed over lower layers and that additional retainer clips 48 can be employed to hold each layer in place, the clips being suitably spaced apart lengthwise of channeling 10.

In FIGURE 6 there is shown an L-shaped connector plate 60 having its respective legs lying in the same plane and at right angles to one another. Each leg is secured to a respective channel end by a pair of fasteners as those indicated at 42 and described above. However, it will be understood that rivets, bolts and self-threaded screws may be employed in lieu of the fasteners 42 if desired.

FIGURE 7 is an enlarged showing of the three branch junction shown in FIGURE 1 and utilizing a T-shaped connector plate 20 to interconnect the three channel ends each of which may be of the same or a different width. Irrespective of this fact the same identical connector plate may be used to complete the junction assembly. This is an important feature since the particular width of the channels joined by a particular connector plate is of no significance due to the absence of upturned flanges on the connector plate. Thus, each connector arm, as manufactured, is customarily provided with a pair of fastener openings appropriately spaced from one another. These fastener openings provide templates for use of a marking punch or a drilling tool in properly locating the holes in the web portion of a channel to be connected therewith. This feature not only expedites the completion of a junction assembly, but permits adjacent ends of the channel at any junction to be spaced in any desired manner relative to one another. In certain installations it may be desirable to locate the channel ends relatively close to one another to provide greater protection for the tubing. In other instances relatively wide spacing may be more suitable, as for example, to accommodate larger radius bends in the particular tubing in use. Standard lengths of channel without holes in their web portions can be terminated at any desired point. An arm of a connector plate is then placed against the back of the web and the holes in the connector plate are used as a template in completing the holes through the channel in the precise positions desired.

FIGURE 8 is an enlarged view of the connector assembly 30 shown in FIGURE 1. It will be observed that the corners of the channel flanges can be located very close to one another, if desired, so as to cooperate in providing greater protection for the tubing. It will also be noted that the arcuate portion of the connector plate 30 interconnecting its two arms has a relatively long radius. This is desirable and serves to safeguard against excessively sharp bending of the tubing at corner junctions.

While the particular channel assembly for flexible tubing, conductors and the like, herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A protective assembly for flexible tubing, conductors and the like comprising, a plurality of elongated rigid channel shaped members having planar sidewalls and planar web portions and openings for fasteners adjacent the ends of the web portions of said members, means for holding the adjacent ends of a plurality of said channel members rigidly together comprising a single rigid connector plate formed from sheet stock having long straight flat ends free of flanges along either lateral edge of said connector plate and overlapping the adjacent ends of respective ones of said channel shaped members, each of said long ends having openings spaced to register with the openings in the webs of said channel members, and fastener means extending through said openings and cooperating to secure said channel members rigidly and immovably together.

2. A protective assembly as defined in claim 1 characterized in that said connector plate has at least two end portions extending at an angle to one another.

3. A protective assembly as defined in claim 1 characterized in that the opposite ends of said connector plate lie in planes at right angles to one another and are interconnected by a flat intermediate portion.

4. A protective assembly as defined in claim 1 characterized in that said connector plate is T-shaped with openings in each end thereof for use in interconnecting the adjacent ends of three said channel shaped members.

5. A protective assembly as defined in claim 1 characterized by the provision of a plurality of channel shaped one-piece self-locking retainer clips for holding tubing firmly seated in said channel members, said retainer clips having a length slightly less than the internal width of said channel shaped member, said retainer clips having sharp edged resilient tongue means projecting from the opposite ends thereof which tongue means are adapted to be deflected outwardly slightly as said clips are depressed inwardly between the side walls of said channel shaped members thereby causing the sharp edges of said tongue means to bite into the side walls of said channel members and lock said retainer clips against reverse movement.

References Cited

UNITED STATES PATENTS

| 152,793 | 7/1874 | Coolidge | 14—14 |
| 230,185 | 7/1880 | Gottlieb | 14—14 |
| 2,081,197 | 5/1937 | Goeller | 138—159 X |
| 2,104,022 | 1/1938 | Chapman | 14—17 X |
| 2,744,708 | 5/1956 | Bedford | 248—73 |
| 2,860,742 | 11/1958 | Waters. | |

FOREIGN PATENTS

| 717,629 | 10/1954 | Great Britain. |

CHANCELLOR E. HARRIS, *Primary Examiner.*

U.S. Cl. X.R.

211—178